United States Patent
Hossain et al.

(10) Patent No.: US 8,752,017 B2
(45) Date of Patent: Jun. 10, 2014

(54) METHOD AND SYSTEM FOR REMOTE DEBUG PROTOCOL PROXYING FOR PRODUCTION DEBUGGING; SELECTIVE SESSION AND USER ROUTING FOR DEBUGGING IN MULTI-TENANT CLOUD COMPUTING INFRASTRUCTURE

(75) Inventors: Fiaz Hossain, San Francisco, CA (US); James Iry, Richmond, CA (US); Nagraj Kulkami, Santa Clara, CA (US); Zuye Zheng, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 79 days.

(21) Appl. No.: 13/109,720

(22) Filed: May 17, 2011

(65) Prior Publication Data

US 2012/0131555 A1 May 24, 2012

Related U.S. Application Data (60) Provisional application No. 61/395,832, filed on May 17, 2010.

(51) Int. Cl.
*G06F 9/44* (2006.01)
*G06F 11/36* (2006.01)

(52) U.S. Cl.
CPC .................. *G06F 11/362* (2013.01)
USPC ........................................................ 717/124

(58) Field of Classification Search
USPC ................................. 717/124–135
See application file for complete search history.

(56) References Cited

U.S. PATENT DOCUMENTS

| | | |
|---|---|---|
| 5,715,450 A | 2/1998 | Ambrose et al. |
| 5,821,937 A | 10/1998 | Tonelli et al. |
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,233,618 B1 * | 5/2001 | Shannon ....................... 709/229 |
| 6,266,669 B1 | 7/2001 | Brodersen et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |
| 6,604,117 B2 | 8/2003 | Lim et al. |

(Continued)

*Primary Examiner* — Satish Rampuria
(74) *Attorney, Agent, or Firm* — David Lewis (57) ABSTRACT

A proxy server receives requests, and determines which application server of a cluster of servers to send the request. The determination may be based on a load balancing algorithm. The proxy server determines whether each request is a debug request. The proxy server send the debug request to a debug server, but blocks unsafe debug statements from reaching the debug server.

17 Claims, 6 Drawing Sheets

(56) References Cited

U.S. PATENT DOCUMENTS

| | | |
|---|---|---|
| 6,604,128 B2 | 8/2003 | Diec |
| 6,609,150 B2 | 8/2003 | Lee et al. |
| 6,637,024 B1* | 10/2003 | Johnson et al. ............... 717/124 |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,941 B1* | 4/2004 | Morshed et al. ............... 717/127 |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,634,759 B2* | 12/2009 | Calsyn et al. ............... 717/124 |
| 7,836,106 B2* | 11/2010 | Willoughby ............... 707/822 |
| 8,336,029 B1* | 12/2012 | McFadden et al. ............ 717/124 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0010778 A1* | 1/2004 | Kaler et al. ............... 717/130 |
| 2004/0015981 A1 | 1/2004 | Coker et al. |
| 2004/0027388 A1 | 2/2004 | Berg et al. |
| 2004/0117489 A1* | 6/2004 | Harmon et al. ............... 709/229 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0199629 A1* | 10/2004 | Bomer et al. ............... 709/224 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010678 A1* | 1/2005 | Pugh et al. ............... 709/232 |
| 2005/0050555 A1 | 3/2005 | Exley et al. |
| 2005/0091098 A1 | 4/2005 | Brodersen et al. |
| 2005/0138113 A1* | 6/2005 | Brendle et al. ............... 709/203 |
| 2006/0101447 A1* | 5/2006 | Koch ............... 717/168 |
| 2006/0259898 A1* | 11/2006 | Reinhardt ............... 717/124 |
| 2006/0259899 A1* | 11/2006 | Cooper et al. ............... 717/127 |
| 2007/0171907 A1* | 7/2007 | Mansutti et al. ............... 370/389 |
| 2007/0283141 A1* | 12/2007 | Pollutro et al. ............... 713/155 |
| 2008/0082986 A1 | 4/2008 | Cheenath et al. |
| 2008/0086735 A1 | 4/2008 | Cheenath et al. |
| 2008/0168428 A1* | 7/2008 | Bates et al. ............... 717/129 |
| 2008/0289025 A1* | 11/2008 | Schneider ............... 726/10 |
| 2010/0205665 A1* | 8/2010 | Komili et al. ............... 726/12 |
| 2010/0235495 A1 | 9/2010 | Petersen et al. |
| 2011/0137940 A1 | 6/2011 | Gradin et al. |
| 2011/0225232 A1 | 9/2011 | Casalaina et al. |
| 2011/0225233 A1 | 9/2011 | Casalaina et al. |
| 2011/0225495 A1 | 9/2011 | Casalaina et al. |
| 2011/0225500 A1 | 9/2011 | Casalaina et al. |
| 2011/0225506 A1 | 9/2011 | Casalaina et al. |
| 2011/0246417 A1 | 10/2011 | Maya et al. |
| 2011/0258233 A1 | 10/2011 | Unger et al. |
| 2011/0258612 A1 | 10/2011 | Matthiesen et al. |
| 2011/0258614 A1 | 10/2011 | Tamm |
| 2011/0265066 A1 | 10/2011 | Fee et al. |
| 2011/0274258 A1 | 11/2011 | Casalaina et al. |
| 2011/0274261 A1 | 11/2011 | Casalaina et al. |
| 2011/0276610 A1 | 11/2011 | Hossain et al. |
| 2011/0276674 A1 | 11/2011 | Jensen-Horne et al. |
| 2011/0276693 A1 | 11/2011 | Jensen-Horne et al. |
| 2011/0276890 A1 | 11/2011 | Jensen-Horne et al. |
| 2011/0276892 A1 | 11/2011 | Jensen-Horne et al. |
| 2011/0276945 A1 | 11/2011 | Chasman et al. |
| 2011/0276946 A1 | 11/2011 | Pletter |
| 2011/0282899 A1 | 11/2011 | Mathew et al. |
| 2011/0282908 A1 | 11/2011 | Fly et al. |
| 2011/0283110 A1 | 11/2011 | Dapkus et al. |
| 2011/0283163 A1 | 11/2011 | Zheng |
| 2011/0283181 A1 | 11/2011 | Waite et al. |
| 2011/0283266 A1 | 11/2011 | Gallagher et al. |
| 2011/0283356 A1 | 11/2011 | Fly et al. |
| 2011/0289140 A1 | 11/2011 | Pletter et al. |
| 2011/0289141 A1 | 11/2011 | Pletter et al. |
| 2011/0289356 A1 | 11/2011 | Hossain et al. |
| 2011/0289425 A1 | 11/2011 | Pletter et al. |
| 2011/0289476 A1 | 11/2011 | Pletter et al. |
| 2011/0289479 A1 | 11/2011 | Pletter et al. |
| 2011/0295728 A1 | 12/2011 | Bulumulla et al. |
| 2011/0302212 A1 | 12/2011 | Agrawal et al. |
| 2011/0302298 A1 | 12/2011 | Lawrance et al. |
| 2011/0302631 A1 | 12/2011 | Sureshchandra et al. |
| 2012/0005537 A1 | 1/2012 | Chen et al. |
| 2012/0017170 A1 | 1/2012 | Lawrance |
| 2012/0030514 A1 | 2/2012 | Lawrance |
| 2012/0066755 A1 | 3/2012 | Peddada et al. |
| 2012/0078917 A1 | 3/2012 | Gradin et al. |
| 2012/0078981 A1 | 3/2012 | Gradin et al. |
| 2012/0079004 A1 | 3/2012 | Herman |
| 2012/0079038 A1 | 3/2012 | Hersh |
| 2012/0086544 A1 | 4/2012 | Kemp |
| 2012/0089610 A1 | 4/2012 | Agrawal et al. |
| 2012/0096046 A1 | 4/2012 | Kucera |
| 2012/0096521 A1 | 4/2012 | Peddada |
| 2012/0101985 A1 | 4/2012 | Kemp et al. |
| 2012/0102063 A1 | 4/2012 | Kemp et al. |
| 2012/0102114 A1 | 4/2012 | Dunn et al. |
| 2012/0102153 A1 | 4/2012 | Kemp et al. |
| 2012/0102402 A1 | 4/2012 | Kwong |
| 2012/0102420 A1 | 4/2012 | Fukahori |
| 2012/0131555 A1 | 5/2012 | Hossain et al. |
| 2012/0136602 A1 | 5/2012 | Hossain |
| 2012/0143817 A1 | 6/2012 | Prabaker et al. |
| 2012/0143917 A1 | 6/2012 | Prabaker et al. |

(56) References Cited

U.S. PATENT DOCUMENTS

| | | |
|---|---|---|
| 2012/0143995 A1 | 6/2012 | Calvin et al. |
| 2012/0144374 A1 | 6/2012 | Gallagher et al. |
| 2012/0173485 A1 | 7/2012 | Kothule et al. |
| 2012/0198279 A1 | 8/2012 | Schroeder |
| 2012/0209947 A1 | 8/2012 | Glaser et al. |
| 2012/0223951 A1 | 9/2012 | Dunn et al. |
| 2012/0331053 A1 | 12/2012 | Dunn |
| 2013/0002676 A1 | 1/2013 | Ziemann |
| 2013/0007029 A1 | 1/2013 | Ziemann |
| 2013/0007049 A1 | 1/2013 | Ziemann |
| 2013/0007126 A1 | 1/2013 | Ziemann |
| 2013/0007148 A1 | 1/2013 | Olsen |
| 2013/0018869 A1 | 1/2013 | Hanson et al. |
| 2013/0018955 A1 | 1/2013 | Thaxton et al. |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024788 A1 | 1/2013 | Olsen et al. |
| 2013/0024910 A1 | 1/2013 | Verma et al. |
| 2013/0031053 A1 | 1/2013 | Tobin et al. |
| 2013/0031054 A1 | 1/2013 | Tobin et al. |
| 2013/0031141 A1 | 1/2013 | Tobin et al. |
| 2013/0031172 A1 | 1/2013 | Olsen et al. |
| 2013/0031487 A1 | 1/2013 | Olsen et al. |
| 2013/0031491 A1 | 1/2013 | Tobin et al. |
| 2013/0031555 A1 | 1/2013 | Tobin et al. |
| 2013/0036406 A1 | 2/2013 | Zheng et al. |
| 2013/0036407 A1 | 2/2013 | Zheng et al. |
| 2013/0054517 A1 | 2/2013 | Beechuk et al. |
| 2013/0054714 A1 | 2/2013 | Bedi |
| 2013/0060859 A1 | 3/2013 | Olsen et al. |
| 2013/0061156 A1 | 3/2013 | Olsen et al. |
| 2013/0091149 A1 | 4/2013 | Dunn et al. |
| 2013/0091217 A1 | 4/2013 | Schneider |
| 2013/0091229 A1 | 4/2013 | Dunn et al. |
| 2013/0091286 A1 | 4/2013 | Spencer |
| 2013/0091350 A1 | 4/2013 | Gluck |
| 2013/0097253 A1 | 4/2013 | Mencke |
| 2013/0117353 A1 | 5/2013 | Wong et al. |
| 2013/0117763 A1 | 5/2013 | Cheenath et al. |
| 2013/0117810 A1 | 5/2013 | Cheenath et al. |
| 2013/0132861 A1 | 5/2013 | Kienzle et al. |

* cited by examiner

METHOD AND SYSTEM FOR REMOTE DEBUG PROTOCOL PROXYING FOR PRODUCTION DEBUGGING; SELECTIVE SESSION AND USER ROUTING FOR DEBUGGING IN MULTI-TENANT CLOUD COMPUTING INFRASTRUCTURE

CLAIM OF PRIORITY

This application claims the benefit of U.S. Provisional Patent Application 61/395,832 entitled METHOD AND SYSTEM FOR REMOTE DEBUG PROTOCOL PROXYING FOR PRODUCTION DEBUGGING; SELECTIVE SESSION AND USER ROUTING FOR DEBUGGING IN A MULTI-TENANT CLOUD COMPUTING INFRASTRUCTURE, by Fiaz Hossain et al., filed May 17, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending or other United States patents and patent applications, including the present application, are related to each other. Each of the other patents/applications listed below are incorporated by reference herein in its entirety:

U.S. Provisional Patent Application 61/395,832 entitled METHOD AND SYSTEM FOR REMOTE DEBUG PROTOCOL PROXYING FOR PRODUCTION DEBUGGING; SELECTIVE SESSION AND USER ROUTING FOR DEBUGGING IN A MULTI-TENANT CLOUD COMPUTING INFRASTRUCTURE, by Fiaz Hossain et al., filed May 17, 2010 and U.S.patent application Ser. No. 13/109,720 entitled, METHOD AND SYSTEM FOR REMOTE DEBUG PROTOCOL PROXYING FOR PRODUCTION DEBUGGING; SELECTIVE SESSION AND USER ROUTING FOR DEBUGGING IN MULTI-TENANT CLOUD COMPUTING INFRASTRUCTURE, by Fiaz Hossain et al., filed May 17, 2011.

FIELD OF THE INVENTION

The subject matter described herein relates to the real-time debugging of production applications and servers in a multi-tenant cloud computing infrastructure.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure efficient retrieval of accurate information and subsequent delivery of this information to the user system has been and continues to be a goal of administrators of database systems. Secure and efficient retrieval of data can be hampered if the system needs to be shutdown to be maintained or is difficult to debug and maintain for other reasons.

The present specification recognizes that debugging and maintaining clustered servers in a multi-tenant cloud computing infrastructure adds to the complexity of debugging and maintaining the database system.

BRIEF SUMMARY

In accordance with embodiments, there are provided mechanisms and techniques for implementing a remote debugging protocol that may be used in a production environment of a multi-tenant cloud computing infrastructure. In one implementation, the mechanisms and techniques include mechanisms and techniques for selectively routing requests based on sessions and user In a cloud computing infrastructure, it is often hard to replicate and debug production issues and situations on simulated test environments. One or more mechanisms and techniques for securely debugging specific production user requests in web application servers, which may be JAVA based in a multi-tenant cloud computing infrastructure may facilitate debugging production user requests. For example, a debug protocol may be used to debug production requests by first isolating specific user and sessions requests that are normally forwarded to an application server, but instead are forwarded to a production debugging server. The debug server may be virtually identical to all of the other application servers in the cloud computing cluster except it accepts requests via a remote debugging protocol. In an embodiment, a remote debugging protocol, such as Java Debug Wire Protocol (JDWP), (which is being used for debugging) enables users to implement traditional debugging functionality such as setting breakpoints, hot swapping code (that is changing the code while the code is running), examining and modifying data, and replaying stack frames (the JDWP is just one non-limiting example of a remote debugging protocol that may be used). Much of this functionality is crucial for diagnosing and debugging code. However in the context of a real-time production environment, e.g., debugging while the code is running, some of the standard remote debugging protocol, such as some of the JDWP functionality, poses risks for misuse., (e.g., such as the ability to change production code or data during debugging). Consequently, in an embodiment, proxy mechanisms and techniques are used in a production environment to intercept debugging instructions from a remote debugger to a debugging server. In one implementation, the mechanisms and techniques examine the debugging instructions for potentially unsafe or unauthorized actions and block the instructions that are determined to be unsafe. The proxy mechanisms and techniques may also log the debug instructions and subsequent actions, so that they may be audited.

While the subject matter is described with reference to mechanisms and techniques for a using a proxy in connection with a remote debugging protocol in a multi-tenant cloud computing infrastructure, embodiments are not limited to multi-tenant databases nor deployment on application servers or systems using of JAVA. Embodiments may be practiced using other database architectures, i.e., ORACLE®, DB2® by IBM and the like without departing from the scope of the embodiments claimed.

Note that any of the embodiments discussed herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided for implementing a remote debugging protocol that may be used in a production environment of a multi-tenant cloud computing infrastructure. In one implementation, the mechanisms and techniques include mechanisms and techniques for selectively routing requests based on sessions and user.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing method and system implementing a remote debugging protocol that may be used in a production environment of a multi-tenant cloud computing infrastructure. In one implementation, the mechanisms and techniques include mechanisms and techniques for selectively routing requests based on sessions and user.

Isolating Sessions and Users in a Multi-Tenant Cloud Computing Infrastructure

In an embodiment, sessions and users are isolated with temporary flags that are enabled for a user or session for a set period of time. In other words, when a user opens up a debugging session from a remote site, for example, for debugging code that is running on a cluster of machines, the messages (e.g., debugging code) that are sent from the user machine may be marked, prior to being sent, by the user machine with flags to indicate that the message being sent relates to debugging code (and the code may currently be running on the cluster of machines). A difficulty stems from attempting to avoid shutting down service to customers of the system while the system is being debugged. Specifically, the debugging code may cause the server running the code or even the entire cluster to crash, which may not work out well for clients of the cluster that are relying on the cluster for giving reliable results while the cluster is being debugged, if precautions are not taken. In an embodiment, all sessions created during this set period of time that match the sessions or users with the temporary flags are marked with a debug flag. The load distribution algorithm (e.g., the proxy server) checks the incoming messages for the flags and routes the flagged messages to the debugging server. The flags may be embedded in the code, the flags may be stored in the meta data of the file containing the code, in a separate file but as part of the same message having the code, and/or may be sent in a separate message that is expected to arrive concurrently or within a short period before or after the debugging message. Furthermore, in an embodiment, all child sessions created from a session with a debug flag also receive the debug flag, which may be referred to as session inheritance. In an embodiment, requests originating from these sessions (that were created from the sessions with the debug flags) also get a debug flag. In an embodiment, the debug flags include the location, programmer ID, and access level of the session. Since in a cloud computing infrastructure, a request can be forwarded to any server, the system forwards requests with session IDs having a debug flag to the debug server. The forwarding of requests may be achieved through a load balancer proxy on each application server that first examines a request and either accepts the request or send the request to another application server, based on the load and based on the debug flag. When the load balancer proxy detects the debug flag in a request, the load balancer proxy may forward the request to the correct debug server for debugging.

Java Remote Debugging Architecture

In an embodiment, remote debugging is based on the Java Platform Debugger Architecture using the Java Debug Wire Protocol (JDWP), but could be based on any other applicable programming language or debugging method.

How to Block/Log HotSwaps and Unsafe Commands

In an embodiment, performing remote debugging in production environment may be accomplished by starting the application server, which may be implemented with a JAVA Virtual Machine (JVM) running an application server, such as Apache, in debug mode with a remote debugger, such as JDWP, enabled and then using the remote debugging capabilities built into a debugger running on a remote system. Some other JAVA application servers that may be used as the application server include Resin, WebLogic Server, Jeus, Broland ES, and Orion Applications Server, to name just a few. Some none-JAVA based application servers that may be used are GNUstepWeb, Zope, Zend Server, and Cerise. Other applications servers may be used instead those listed. Many application servers have features built in that allow for remote debugging. If the debugging server does not have a built-in remote debugger the server can be configured for remote debugging with remote debugging packages such as MyEclipse. Although in this specification JDWP is often used as an example of a remote debugging protocol, and although specific commands are discussed, JDWP and the specific commands are just examples. Statements, methods, routines, functions, and Combinations of statements methods, functions and routines form other languages that have the same purpose may also be used instead. In an embodiment, there may be a socket dedicated for receiving communications from the proxy server for the debug server. The debugger may be blocked from performing the unsafe commands, by a proxy server receiving a communication sent, using the remote debugging protocol (such as JDWP protocol), to the application server, which may be implemented on a JVM and which may optionally occur through a set socket. The proxy server may read all the requests made by the remote debugging protocol and may log each debug command for auditing. The proxy server and/or debugger may also watch out for the unsafe commands and block the unsafe server from being sent to the JVM. The proxy may do the following:

Log all debugging commands sent from a dusty hub to the debug server.

Block all unsafe and undesirable commands.

Pass through all other safe debugging commands.

The dusty hub may be a remote server that developers may login to for running a debugging session. In an embodiment, the dusty hub may be the only host that is permitted to connect to the debug server. All other hosts may be blocked by firewall rules.

System Overview

Figure 1:
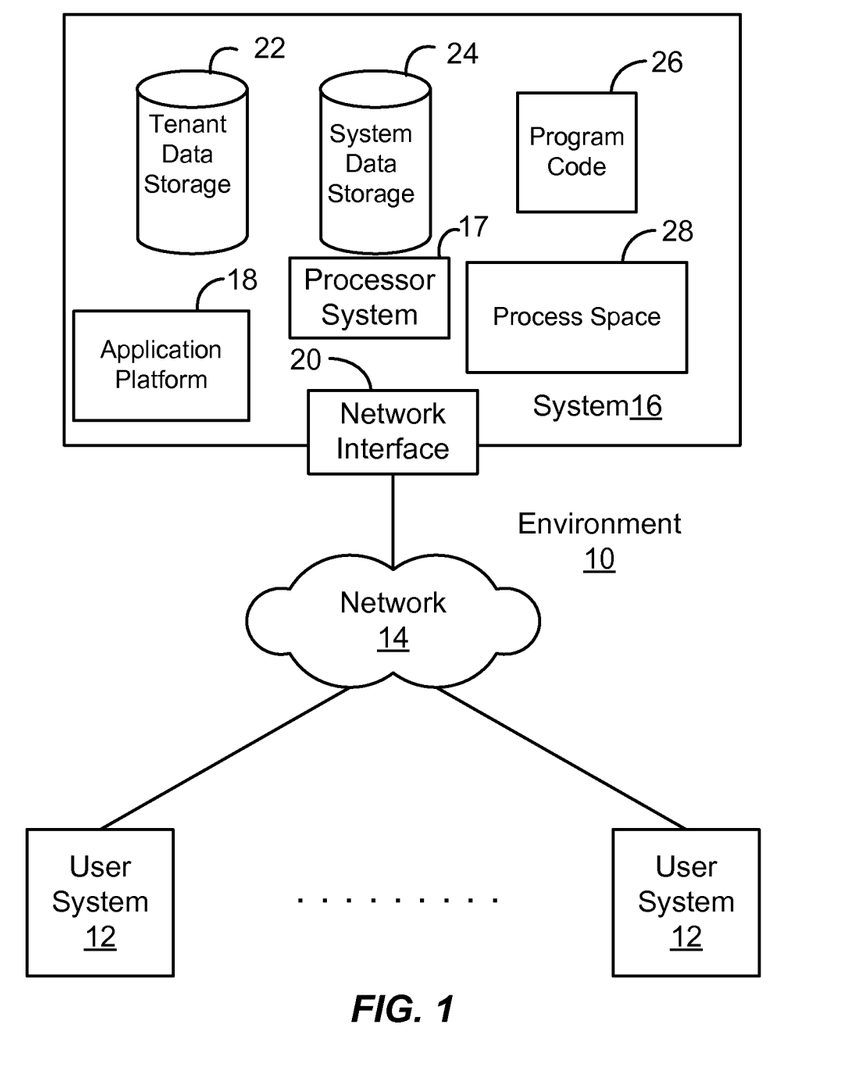
FIG. 1 illustrates a block diagram of an example of an environment wherein an on-demand database service might be used, according to one embodiment.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
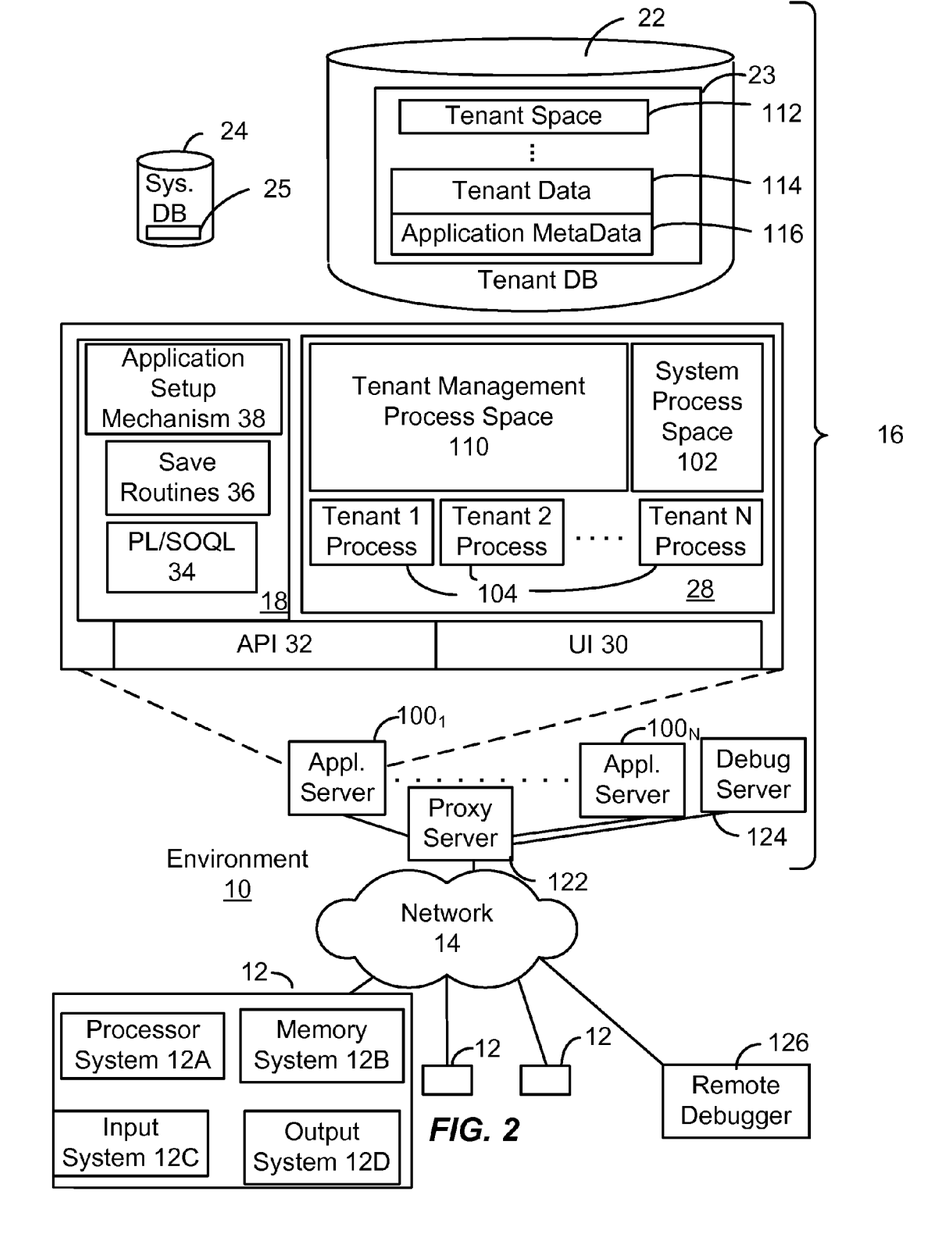
FIG. 2 illustrates a block diagram of an embodiment of elements of FIG. 1 and various possible interconnections between these elements, according to one embodiment.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI)

30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, application metadata 116, proxy server 122, debug server 124, and remote debugger 126. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations. In an embodiment, the load balancing proxy is stored in the memory of each application server, but can alternately be housed in a separate server specially designated to act as a load balancing proxy server, sitting between the application servers $100n$ and network 14.

In an embodiment, as an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In one implementation, proxy server 122 receives incoming messages and determines where to route them. If a message does not have a debug flag set, the message is sent to the appropriate application server $100_1$-$100_N$, this can be based on a load balancing algorithm or not. If the message has the debug flag set, the message is sent to the debug server 124. Debug server 124 is discussed further in conjunction with FIG. 3.

Figure 3:
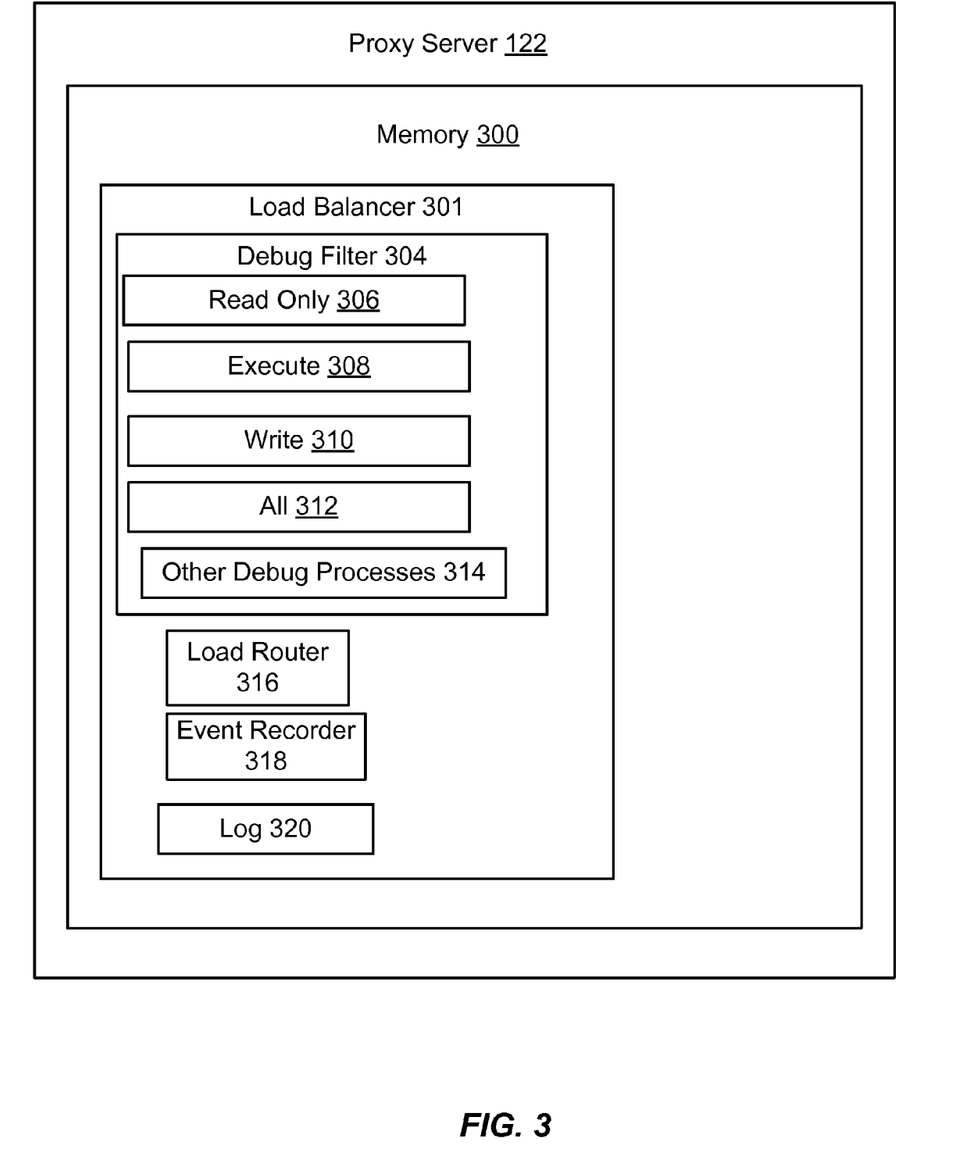
FIG. 3 illustrates a block diagram of various debugging levels, according to one embodiment.

FIG. 3 illustrates a block diagram of the various debugging levels executed by the debug server 124. Debug server 124, memory 300, load balancer 301, debug filter 304 having read only debugging level 306, execute debugging level 308, write debugging level 310, and all debugging level 312, other debugging processes 314, load router 316, event recorder 318, and log 320. In other embodiments, debug server 124 may not have all of the elements listed above and/or may have other elements in addition to or instead of those listed above.

Remote debugger 126 may be a dusty hub via which users may remotely submit debug jobs and/or instructions that include debug code.

Debug server 124 may be a computerized server system where debugging commands are implemented as input by a programmer or automated software. Load balancer 301 is an algorithm that balances the load between applications servers $100_1$-$100_N$. Load balancer 301 determines which server to send messages based on the overall load of the system. Load balancer 301 may implement a round robin load balancing method or keep track of the load on each server and send an incoming request to the server with the lowest load, or may balance the load in another manner. Debug filter 304 may be an algorithm and/or a set of rules used by load balancer 301 to determine whether a set of instructions contains unsafe debug statements and filter the statements from the code by blocking just the unsafe debug instructions and/or the code having the unsafe debug instruction. Debugging levels 306-312 may be the instructions and/or rules that determine whether a particular command is entitled to a particular level of access.

In an embodiment, the level of debugging access can be set by a programmer and/or automated software. The level of debugging access might change depending on the programmer accessing the debugging system, the type of task being performed, the type of information being accessed, the tenant to which the information being accessed pertains or any other such metric that may affect the production environment.

Memory 300 may be a portion of the memory of debug server 124. Memory 300 may store instructions and/or rules for designating the level of access and what actions can be executed within each level of access. In an embodiment, within memory 300, there are five levels of access, each progressive level allowing more freedom to change the data within the server system. In an embodiment, the five levels of access escalate in allowing the possibility of causing a failure if an error exists in the code. In other embodiments, memory 300 may contain more levels, fewer levels, and/or different levels than those listed above. For example, the read only debugging level 304 might be excluded. In other words, in general the greater the degree of freedom allowed in a particular level, the greater the possibility that a mistake will cause a failure. Thus the higher levels of debugging access may be reserved for code that has undergone more thorough testing or that is further along in the development process.

In an embodiment, read only debugging level 304 is the default setting for the debugging level setting. Read only debugging level 304 may block a hot code replace, a variable value replace, and an invoking of an early return of a method. Hot code replace is a debugging technique whereby the debugger transmits edited class files or new class files to a JAVA virtual machine. A programmer can start a debugging session and change a Java file, and the debugger may replace the code in the receiving virtual machine while the receiving virtual machine is running without having to restart the machine. Variable value replace may involve a programmer replacing parts of code within an object. Invoke/early return is when a programmer calls a function. In an embodiment, read only debugging level 304 only allows the programmer to view the output of the code but not change the code. The read only debugging level 304 may allow programmers to look at code without the danger of making unwanted changes or keep unauthorized users from making changes to code.

Execute debugging level 308 may block certain types or all hot code replaces and/or variable value replacements. Execute debugging level 308 may allow invoke/early return so that a programmer and/or automated system can call context methods and all operations in a read only debugging level of access. A context method is a different system for associating objects with one another based on the environment the objects are in, rather than associating objects by their type. In execute debugging level 308, there may be some possibility of a programmer invoking a method that could potentially change data.

Write debugging level 310 may block a hot code replace, but allow a variable value replace. Write debugging level 310 may allow a variable value replace and may allow all permissions of read only debugging level 304 and execute debugging level 308.

In an embodiment, all debugging level 312 does not block any commands. All commands may be allowed and the only security in this mode may be that operations are logged. In an embodiment, all operations are logged at all levels.

In an embodiment, a hot swap is the process defined by the 'HotSwap Class File Replacement in the Java Platform Debugger Architecture, which enables the debugger to replace code running in a JAVA Virtual Machine (JVM). In JAVA it is possible to block a hot swap by blocking two processes: Redefine Classes and Pop Frame. Specifically, the VirtualMachine.RedefineClasses lets the user swap out the bytes of the old class definition with that of the new class definition in the JVM and the StackFrame.PopFrames lets the user pop frames off the stack to rerun code. By blocking these commands, code cannot be replaced or re-written while a java virtual machine is running.

Regarding blocking variable value replacements, JDWP and JDPA both provide commands for replacing the values of static and field variables during debugging, which also should not be allowed in production debugging. In an embodiment, it is possible to block variable value replacements by blocking the following JDWP commands which enable replacing the values of static and field variables during debuggin. In an embodiment, VirtualMachine.CreateString is used to create a string in the JVM and return the ID. The VirtualMachine.CreateString command does not directly relate to replacing values, but it should not be necessary to create a string for production debugging. In an embodiment, ClassType.SetValues may be used to set the value of one or more static fields including that of the private fields, where when in use, the string "ClassType" is replaced by the actual class type desired. ClassType.NewInstance creates a new object of the same class type as "ClassType," invoking the specified constructor. ArrayType.NewInstance may be used to create a new array object of the same type as the original instance, with a given length ObjectReference.SetValues may be used to set the value of one or more fields of an object that is an instance of a class type. ArrayReference.SetValues may be used to set a range of array components.

StackFrames.SetValues may be used to set the value of one or more local variables even if the local variable is not available. In an embodiment, commands are blocked from being executed by the proxy server, which reads the debug flag on the command and does not pass on the command if the access level is not high enough. In an embodiment, each of the above commands is blocked if variable replacements are blocked and/or if the level of access is only execute debugging level 308 or lower.

Other Unsafe Debugging Commands

The commands listed below do not directly relate to swapping code, class definitions, or variable values, but may be still unsafe for production, and in an embodiment may be blocked at one or more levels of debugging access.

In an embodiment, the command ObjectReference.InvokeMethod invokes and instance of a method and may be blocked, or any routine that invokes an instance of a method may be blocked. For one embodiment, in at least some access debugging levels the ObjectReference. InvokeMethod may be allowed because ObjectReference.InvokeMethod allows the method to be debugged while preventing the context values from being viewed.

In an embodiment, in at least as some debugging access levels, ThreadReference.ForceEarlyReturn or any function that forces the early return on a method (e.g., such that no further instructions are executed) an/or any routine that is likely to result in connections being left open, and/or database data not being cleaned up is blocked.

Although a list of unsafe commands has been given, other embodiments may contain more or less unsafe commands different from those listed above that are blocked at one or more levels of access.

Other debugging processes may include other instructions that need to be filtered and/or may not need some of the instructions mentioned herein to be filtered. Load router 316 balances the load of the incoming items that need to be processed by application servers $100_1$-$100_N$. Load router 316 is the portion of load balancer 301 that performs the core function of balancing the load (in contrast load balancer 301 may have many other functions in addition to load balancing that it performs, via debug filter 304 and/or event recorder 318, which will be discussed below). Load router 316 is also the portion of the code that routes debug messages to the debug server, that have not been blocked by debug filter 304 Event recorder 318 records the events that occur at the proxy server 122, such as the debugging statements that are blocked or passed on to debug server 124. Log 320 is log of events recorded by event recorder 318.

Figure 4:
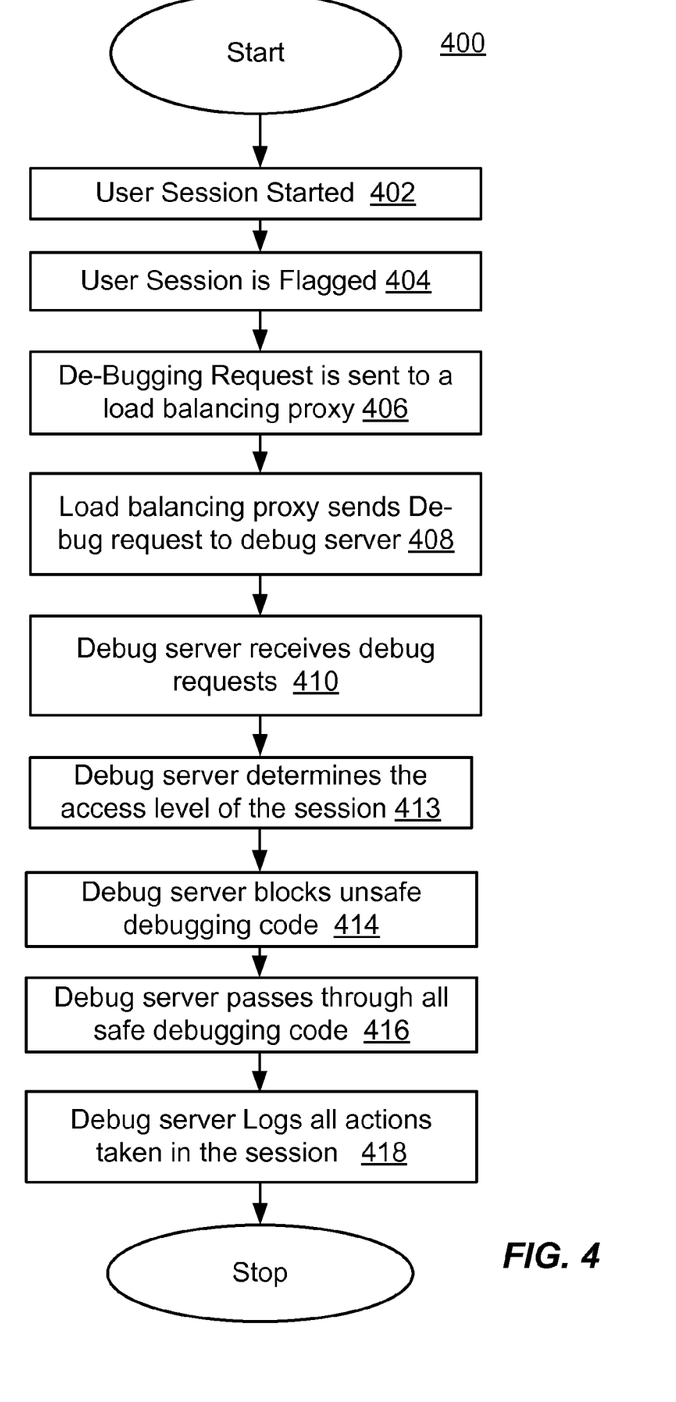
FIG. 4 illustrates a flow chart of a method for implementing a remote debugging protocol proxy, according to one embodiment.

FIG. 4 shows a flowchart of an example of a method 400 for implementing a remote debugging protocol that may be used in a production environment of a multi-tenant cloud computing infrastructure. In one implementation, the mechanisms and techniques include mechanisms and techniques for selectively routing requests based on sessions and user. Method 400 may be implemented by proxy server 122. In step 402, in an embodiment, a user debugging session is created. Optionally, the debugging session may be created from a remote location. Alternatively, the user debugging session might be created locally. The debugging session may be created by opening a debug application and creating debugging code. The debugging code may include statements for generating output that shows interim results so that the dataflow and/or computations in a process may be followed. The debugging code may include hot swaps, variable replacements early exiting of routines and/or many other types of debugging machine instructions, for example. Step 402 may include the user submitting debugging code to a system of multiple servers for execution.

In step 404, in an embodiment, the user session is then flagged. In an embodiment, all of the requests generated during this user session are also flagged. In an embodiment, the flags placed on the user session and the requests are temporary. In an embodiment, the debugging flag is removed after the requests have been processed and either passed on for execution or denied.

In step 406, in an embodiment, a debug request is generated and sent to a load balancing proxy server. In an embodiment, the proxy server may reside locally within the application servers. For example, each application server may have a load balancing routine or proxy server. In other embodiments, there may be one proxy server that may be located remotely and connected to the application servers by communication protocols. In step 408, the load balancing proxy server then routes the request to a debug server.

In step 408, the load proxy server determines whether the debug flag is set for the request received. In an embodiment, the debug server could be a machine built to be function as a server running debug software, or a general purpose computer running server software that also runs debug software. In an embodiment, the load balancing proxy sends requests to the debug server based on the debug session flag attached to the requests. In an embodiment, the load balancing proxy sends a debug request to an application server which then automatically runs debugging software when the request is received.

In step 410, in an embodiment, the debug server receives the debugging request from the load balancing proxy. In step 413, the debug server determines the access level of the session from which request was generated. In an embodiment, determines the access level is determined by referencing the debug flag that was placed on the session when the session was initiated. In step 414, in an embodiment, the proxy server blocks all flagged debugging requests which are categorized as unsafe. Step 414 may involve comparing the level of access authorized to the request, and if a debugging statement requires a level of access that the request is not entitled to, the debugging statement is not passed to the debugging server. If a debugging statement requires a level of access that the request is entitled to, control is passed to step 416. In step 416, the debugging server then passes through all of the debugging requests categorized as safe. In step 418, in an embodiment, the proxy server logs all of the received requests and actions. Step 418 may include logging each statement passed to the debugging server and each statement blocked from being passed to the debugging server.

In another embodiment, although depicted as distinct steps in FIG. 4, steps 402-418 may not be distinct steps. In other embodiments, method 400 may not have all of the above steps and/or may have other steps in addition to, or instead of, those listed above. The steps of method 400 may be performed in another order. Subsets of the steps listed above as part of method 400 may be used to form their own method.

Figure 5:
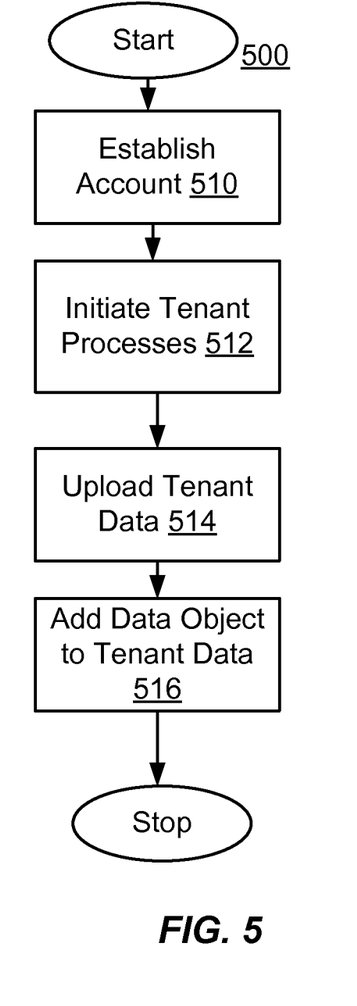
FIG. 5 illustrates a flowchart of an example of using element 10 of FIG. 1, according to one embodiment.

FIG. 5 shows a flowchart of an example of a method 500 of using environment 10. In step 510, user system 12 (FIGS. 1 and 2) establishes an account. In step 512, one more tenant process space 104 (FIG. 2) are initiated on behalf of user system 12, which may also involve setting aside space in tenant space 112 (FIG. 2) and tenant data 114 (FIG. 2) for user system 12. Step 512 may also involve modifying application metadata to accommodate user system 12. In step 514, user system 12 uploads data. In step 516, one or more data objects are added to tenant data 114 where the data uploaded is stored. In another embodiment, although depicted as distinct steps in FIG. 5, steps 502-516 may not be distinct steps. In other embodiments, method 500 may not have all of the above steps and/or may have other steps in addition to, or instead of, those listed above. The steps of method 500 may be performed in another order. Subsets of the steps listed above as part of method 500 may be used to form their own method.

Method for Creating the Environment (FIGS. 1 and 2)

Figure 6:
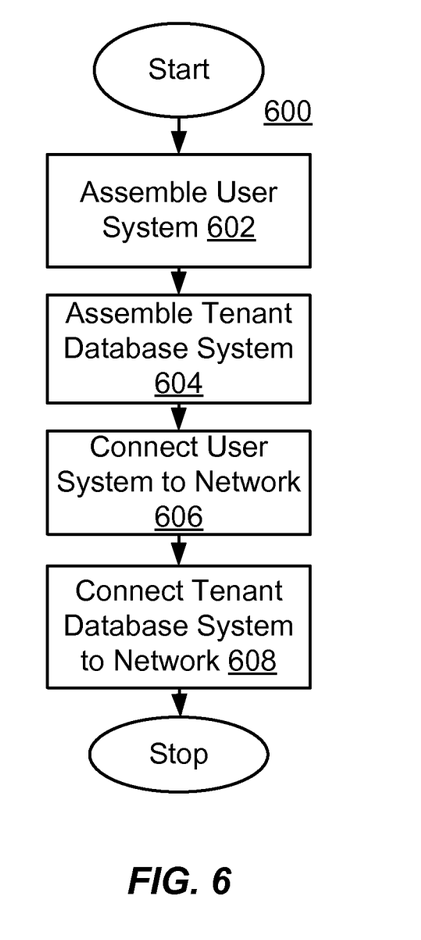
FIG. 6 illustrates a flowchart of an example of making element 10 of FIG. 1, according to one embodiment.

FIG. 6 is a method of making environment 10, in step 602, user system 12 (FIGS. 1 And 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. In step 604, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 2).

In step 606, user system 12 is communicatively coupled to network 104. In step 608, system 16 is communicatively coupled to network 104 allowing user system 12 and system 16 to communicate with one another (FIG. 2). In step 610, one or more instructions may be installed in system 16 (e.g., the instructions may be installed on one or more machine readable media, such as computer readable media, therein) and/or system 16 is otherwise configured for performing the steps of methods described above. For example, as part of step 610, one or more instructions may be entered into the memory of system 16 for the methods described above.

In another embodiment, although depicted as distinct steps in FIG. 6, steps 602-610 may not be distinct steps. In other embodiments, method 600 may not have all of the above steps and/or may have other steps in addition to, or instead of, those listed above. The steps of method 600 may be performed in another order. Subsets of the steps listed above as part of method 600 may be used to form their own method.

Extensions and Alternatives

In an embodiment, a debugging algorithm could be hardwired into a the debugging server or hardwired on a chip installed in the debugging server and/or stored in firmware. In an embodiment, instead of having just one debug server in a cluster there may be multiple debug servers. In an embodiment, in which there are multiple debug servers. The proxy server performs a load balancing algorithm to determine which debug server to send the code being debugged.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for selective session and user routing for debugging in multi-tenant cloud computing infrastructure in a database system, the method comprising:

receiving at proxy server machine a request, the proxy machine including a processor system including one or more processors and a memory storing machine instructions for the proxy server machine, the proxy server machine being associated with a cluster of machines;

determining, by the processor system, whether the request is a debugging request;

if the request is a debugging request, determining if the debugging request is safe, the determining of whether the request includes the debugging request is safe, includes at least determining a debug level that is permitted to the request, the debug level being an extent to which a debug statement is granted permission to change code and determining whether there are any debug statements in the request that require a debug level that is not permitted to the request;
if the debugging request is determined to be safe, processing the debugging request at a debug server; and
if it is determined that the request includes a debug statement that is not safe, blocking at least the debug statements that are determined to be unsafe; and
if the request is not a debugging request, determining which machine from a cluster of machines associated with the proxy server to send the request.

2. The method of claim 1, the determining being performed by the proxy server determining whether the request has a session id with a debug flag.

3. The method of claim 2, further comprising: removing the debug flag after the code is sent to the debug server.

4. The method of claim 1, the determining of whether there are any debug statements in the request that require a level of access that is not permitted including determining which of a plurality of debug levels is associated with the request.

5. A method for selective session and user routing for debugging in multi-tenant cloud computing infrastructure in a database system, the method comprising:
receiving at proxy server machine a request, the machine including a processor system including one or more processors and a memory storing machine instructions for the proxy server machine;
determining, by the processor system, whether the request is a debugging request;
if the request is a debugging request, determining if the debugging request is safe by sending the debugging request to a debug server;
determining, by the proxy server, whether the request includes debug statements that are not safe; and
if it is determined that the request includes debug statements that are not safe, blocking the debug statements that are determined to be unsafe;
the determining of whether the request includes the debug statements that are unsafe, includes at least determining a level of debug access that is permitted to the request, and determining whether there are any debug statements in the request that require a level of access that is not permitted to the request;
the determining of whether there are any debug statements in the request that require a level of access that is not permitted including which of a plurality of debug levels is associated with the request;
the plurality of debug levels including at least one level that only allows debug statements that facilitate viewing output, but does not allow debug statements that change portions of program statements.

6. The method of claim 4, the plurality of debug levels including at least one level that allows debug statements that facilitate swap change variables, which change values of variables, but does not allow debug statements that change portions of program statements.

7. The method of claim 4, the plurality of debug levels including at least one level that allows debug statements that swap portions of code.

8. A method for selective session and user routing for debugging in multi-tenant cloud computing infrastructure in a database system, the method comprising:
receiving at proxy server machine a request, the machine including a processor system including one or more processors and a memory storing machine instructions for the proxy server machine;
determining, by the processor system, whether the request is a debugging request; and
if the request is a debugging request, determining if the debugging request is safe by sending the debugging request to a debug server;
determining, by the proxy server, whether the request includes debug statements that are not safe; and
if it is determined that the request includes debug statements that are not safe, blocking the debug statements that are determined to be unsafe;
the determining of whether the request includes the debug statements that are unsafe, includes at least determining a level of debug access that is permitted to the request, and determining whether there are any debug statements in the request that require a level of access that is not permitted to the request;
the determining of whether there are any debug statements in the request that require a level of access that is not permitted including which of a plurality of debug levels is associated with the request;
the plurality of debug level including at least one level that permits debug statements that invoke returns, but does not allow variable changes.

9. The method of claim 1, further comprising, logging statements that are blocked.

10. A method for selective session and user routing for debugging in multi-tenant cloud computing infrastructure in a database system, the method comprising:
receiving at proxy server machine a request, the machine including a processor system including one or more processors and a memory storing machine instructions for the proxy server machine;
determining, by the processor system, whether the request is a debugging request; and
if the request is a debugging request, determining if the debugging request is safe by sending the debugging request to a debug server;
blocking at least two debug processes, blocking one debug process that modifies a class definition of an existing class while the code being debugged is running; and
another process that pops frames off a stack to rerun code, by blocking the at least two debug processes, code cannot be replaced or re-written while running.

11. he method of claim 1, each server of the cluster, including the debug server, running the same software, except the debug server also runs debug software.

12. The method of claim 11, the cluster of servers running a multi-tenant relational database service over a wide area network in which each tenant is provided usage of a portion of the database as service, the tenant not being required to download software or maintain the database, the multi-tenant database including one or more tenants that are organizations having clients and members that are users of the multi-tenant database as a result of the tenant being a tenant of the multi-tenant database.

13. A method for selective session and user routing for debugging in multi-tenant cloud computing infrastructure in a database system, the method comprising:
receiving at proxy server machine a request, the machine including a processor system including one or more processors and a memory storing machine instructions for the proxy server machine;
determining, by the processor system, whether the request is a debugging request; and if the request is a debugging request, determining if the debugging request is safe by sending the debugging request to a debug server;

the debug server being an application server that is part of a cluster of servers;

each server of the cluster, including the debug server, running the same software, except the debug server also runs debug software;

the determining being performed by at least the proxy server determining whether the request has a session id with a debug flag;

the cluster of servers running a multi-tenant relational database service over a wide area network in which each tenant is provided usage of a portion of the database as service, the tenant not being required to download software or maintain the database, the multi-tenant database including one or more tenants that are organizations having clients and members that are users of the multi-tenant database as a result of the tenant being a tenant of the multi-tenant database;

the method further comprising:

removing the debug flag after the code is sent to the debug server;

determining, by the proxy server, whether the request includes debug statements that are not safe by at least determining a level of debug access that is permitted to the request, and determining whether there are any debug statements in the request that require a level of access that is not permitted to the request; the plurality of debug levels including at least
- a first level that only allows debug statements that facilitate viewing output, but does not allow debug statements that change portions of statements;
- a second level that allows invoking returns and early return in addition to allowing debug statements that facilitate viewing output and
- a third level that allows debug statements that change values of variables, but does not allow debug statements that change portions of statements; and
- a fourth level that allows all debug statements;

if it is determined that the request includes at least one statements that is not safe, blocking the debug statements that are determined to be unsafe;

the determining of whether there are any debug statements in the request that require a level of access that is not permitted including which of a plurality of debug levels is associated with the request; and logging statements that are blocked.

14. The method of claim 13, if the level of access is determined to be the first level, the second level, or the third level, blocking at least two debug processes, blocking one debug process that swaps a prior class definition with a new class definition; and another process that pop frames off a stack to rerun code, by blocking the at least two debug processes, code cannot be replaced or rewritten while the code being debugged is running.

15. The method of claim 13, if the level of access is determined to be the first level or the second level, blocking a debug process used to create a string and return an identifier associated with the string created while the code being debugged is running;

blocking a debug process for setting a value of one or more static fields while the code being debugged is running;

blocking a debug process for creating a new instance of a class while the code being debugged is running;

blocking a debug statement for creating a new array object while the code being debugged is running;

blocking a debug process for setting the value of one or more fields of an object that is an instance of a class type;

blocking a debug process that sets a range of array components while the code being debugged is running;

blocking a process that sets one or more local variables even if the local variable; and blocking a debug process that invokes an instance of a method while the code being debugged is running.

16. A non-transitory machine readable medium having stored thereon one or more machine instructions, which when implemented cause one or more processor to implement a method comprising:

receiving at proxy server machine a request, the machine including a processor system including one or more processors and a memory storing machine instructions for the proxy server machine;

determining, by the processor system, whether the request is a debugging request; and if the request is a debugging request, determining if the debugging request is safe, the determining of whether the request includes the debugging request is safe, includes at least determining a debug level that is permitted to the request, the debug level being an extent to which a debug statement is granted permission to change code and determining whether there are any debug statements in the request that require a debug level that is not permitted to the request;

if the debugging request is determined to be safe, processing the request at a debugging server;

if it is determined that the request includes a debug statement that is not safe, blocking at least debug statements that are determined to be unsafe; and if the request is not a debugging request, determining which machine from a cluster of machines associated with the proxy server to send the request.

17. A system comprising one or more processors;

one or more storage systems having one or more machine readable media having stored thereon one or more machine instructions, which when implemented cause one or more processor to implement a method comprising:

receiving at proxy server machine a request, the machine including a processor system including one or more processors and a memory storing machine instructions for the proxy server machine;

determining, by the processor system, whether the request is a debugging request; and if the request is a debugging request, determining if the debugging request is safe, the determining of whether the request includes the debugging request is safe, includes at least determining a debug level that is permitted to the request, the debug level being an extent to which a debug statement is granted permission to change code and determining whether there are any debug statements in the request that require a debug level that is not permitted to the request;

if the debugging request is determined to be safe, processing the request at a debugging server;

if it is determined that the request includes a debug statement that is not safe, blocking at least debug statements that are determined to be unsafe; and if the request is not a debugging request, determining which machine from a cluster of machines associated with the proxy server to send the request.

* * * * *